United States Patent
Nakano et al.

(10) Patent No.: US 9,848,166 B2
(45) Date of Patent: Dec. 19, 2017

(54) COMMUNICATION UNIT

(71) Applicant: Daiwa House Industry Co., Ltd., Osaka (JP)

(72) Inventors: Tsukasa Nakano, Osaka (JP); Takashi Orime, Osaka (JP); Kenji Hirosawa, Osaka (JP); Hiroyuki Yajima, Osaka (JP); Hiroyuki Yoshida, Osaka (JP)

(73) Assignee: Daiwa House Industry Co., Ltd., Osaka-shi, Osaka (JP)

( * ) Notice: Subject to any disclaimer, the term of this patent is extended or adjusted under 35 U.S.C. 154(b) by 0 days.

(21) Appl. No.: 15/129,954

(22) PCT Filed: Mar. 26, 2015

(86) PCT No.: PCT/JP2015/059390
§ 371 (c)(1),
(2) Date: Sep. 28, 2016

(87) PCT Pub. No.: WO2015/147168
PCT Pub. Date: Oct. 1, 2015

(65) Prior Publication Data
US 2017/0142367 A1   May 18, 2017

(30) Foreign Application Priority Data
Mar. 28, 2014   (JP) .................................. 2014-068734

(51) Int. Cl.
*H04N 7/14* (2006.01)
(52) U.S. Cl.
CPC .................... *H04N 7/147* (2013.01)

(58) Field of Classification Search
CPC ........................................................ H04N 7/14
See application file for complete search history.

(56) References Cited

U.S. PATENT DOCUMENTS

| 6,674,458 | B1 * | 1/2004 | Cohen-Solal | H04N 7/147 |
| | | | | 348/14.01 |
| 9,350,940 | B1 * | 5/2016 | Baker | H04N 7/141 |

(Continued)

FOREIGN PATENT DOCUMENTS

| JP | 2004-357034 A | 12/2004 |
| JP | 2006-285308 A | 10/2006 |

(Continued)

*Primary Examiner* — Stella Woo
(74) *Attorney, Agent, or Firm* — Young Basile Hanlon & MacFarlane, P.C.

(57) ABSTRACT

A communication unit prevents a malfunction which initiates communication against a user's will when communication for the purpose of remote dialog, without requiring a complex operation on the part of the user. This communication unit, used when a sender transmits his or her image or speech information to a recipient, comprises: a device that acquires image and speech information; a home server that transmits communication data indicating the information acquired by the information acquisition device to a device possessed by the recipient; and a detection unit that detects an object to be detected which is generated or changed by an action of the sender. The detection unit detects mutually different types of the objects each to be detected. Then, the home server starts transmitting the communication data when each detection result from each of two or more types of the detection units satisfies a predetermined condition.

4 Claims, 11 Drawing Sheets

(56) References Cited

U.S. PATENT DOCUMENTS

| | | | |
|---|---|---|---|
| 2007/0229652 A1* | 10/2007 | Center, Jr. | H04N 7/147 348/14.08 |
| 2010/0177025 A1 | 7/2010 | Nagata et al. | |
| 2010/0312833 A1* | 12/2010 | Rimmer | G08B 21/0415 709/204 |
| 2013/0329000 A1* | 12/2013 | Cain | H04N 7/15 348/14.08 |

FOREIGN PATENT DOCUMENTS

| | | |
|---|---|---|
| JP | 2007-049510 A | 2/2007 |
| JP | 2011-139360 A | 7/2011 |
| JP | 2012-178621 A | 9/2012 |
| JP | 3181046 U | 1/2013 |
| WO | 2009122716 A1 | 10/2009 |

* cited by examiner

DURING A DIALOGUE

AT THE NORMAL TIME

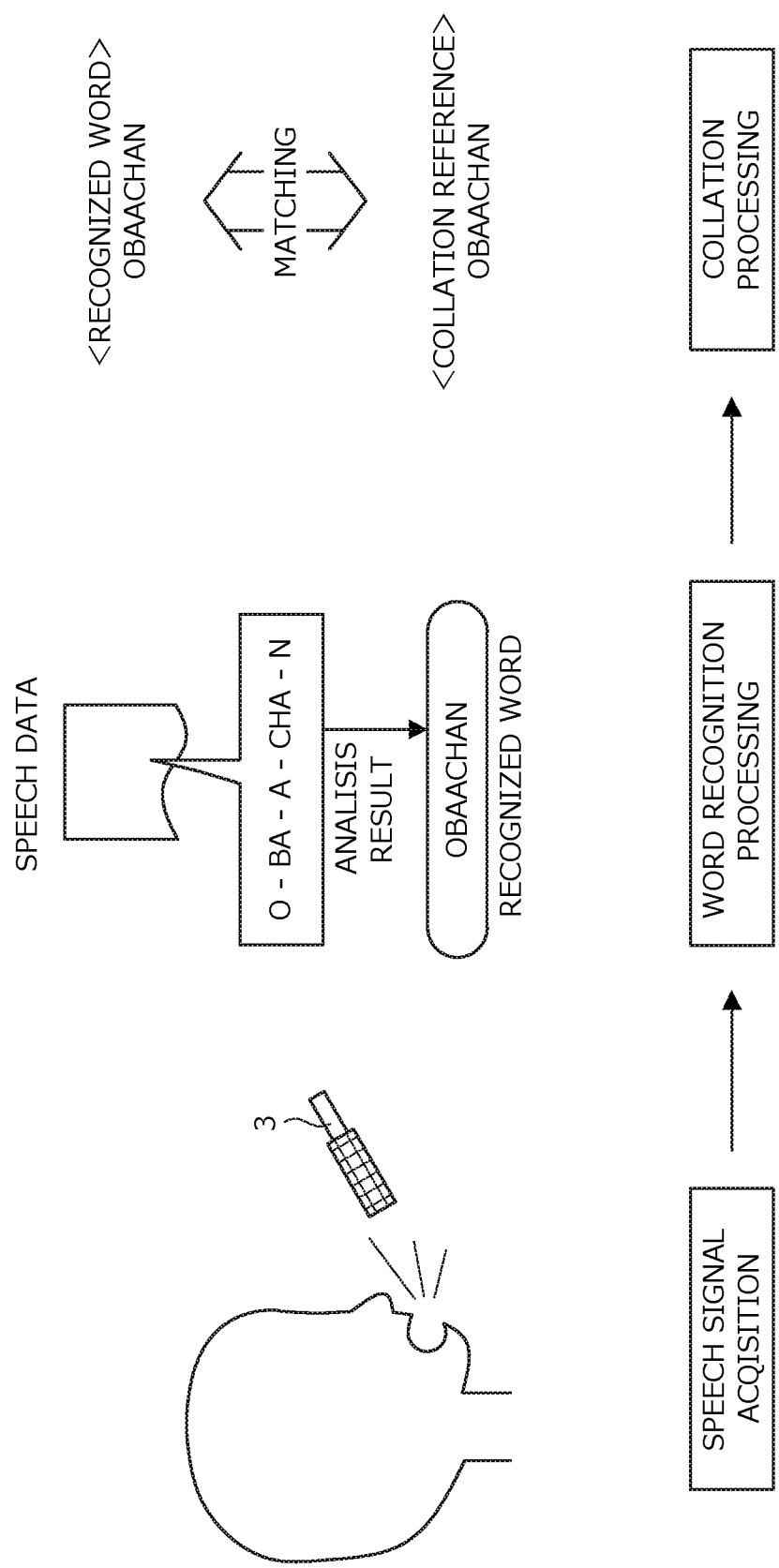

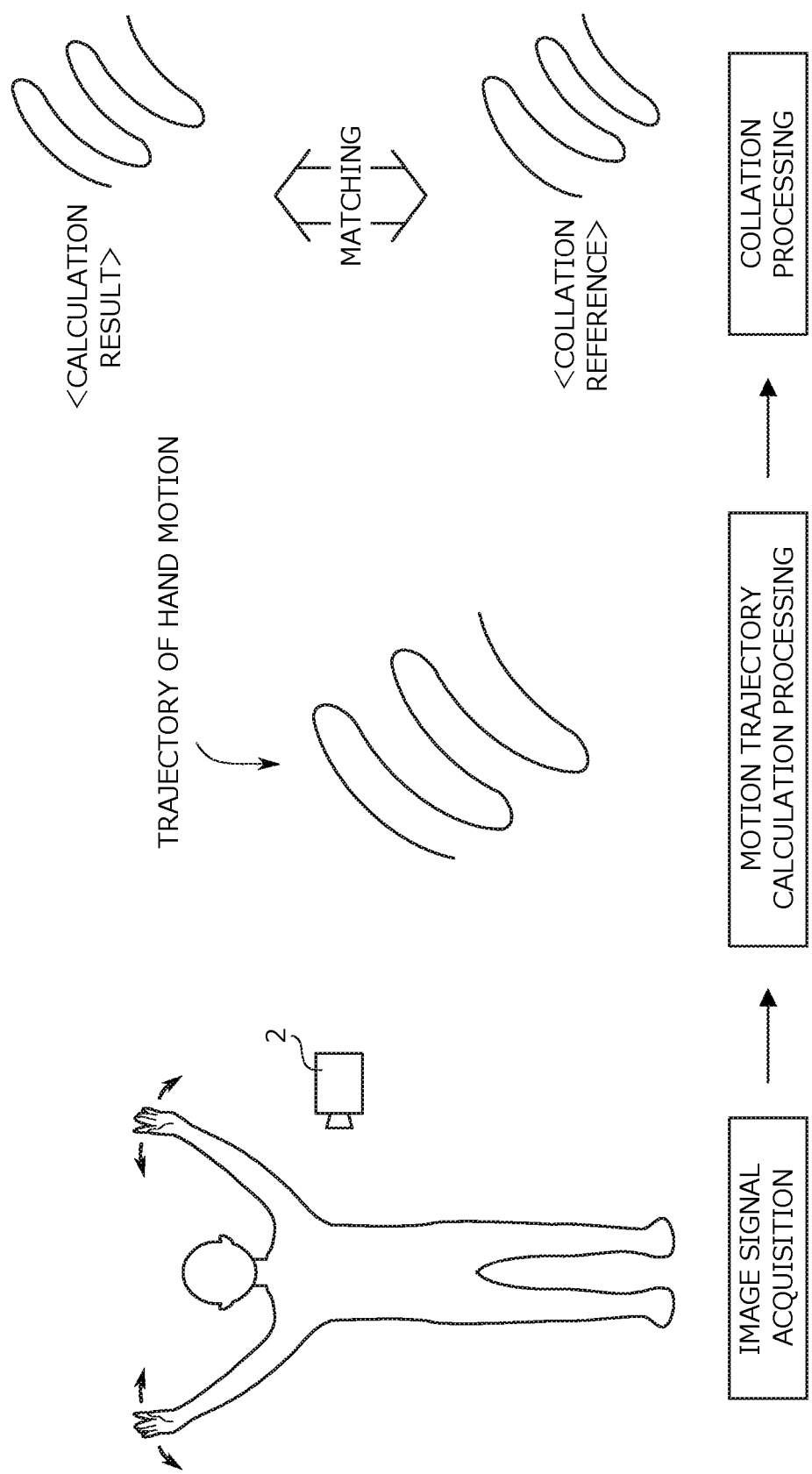

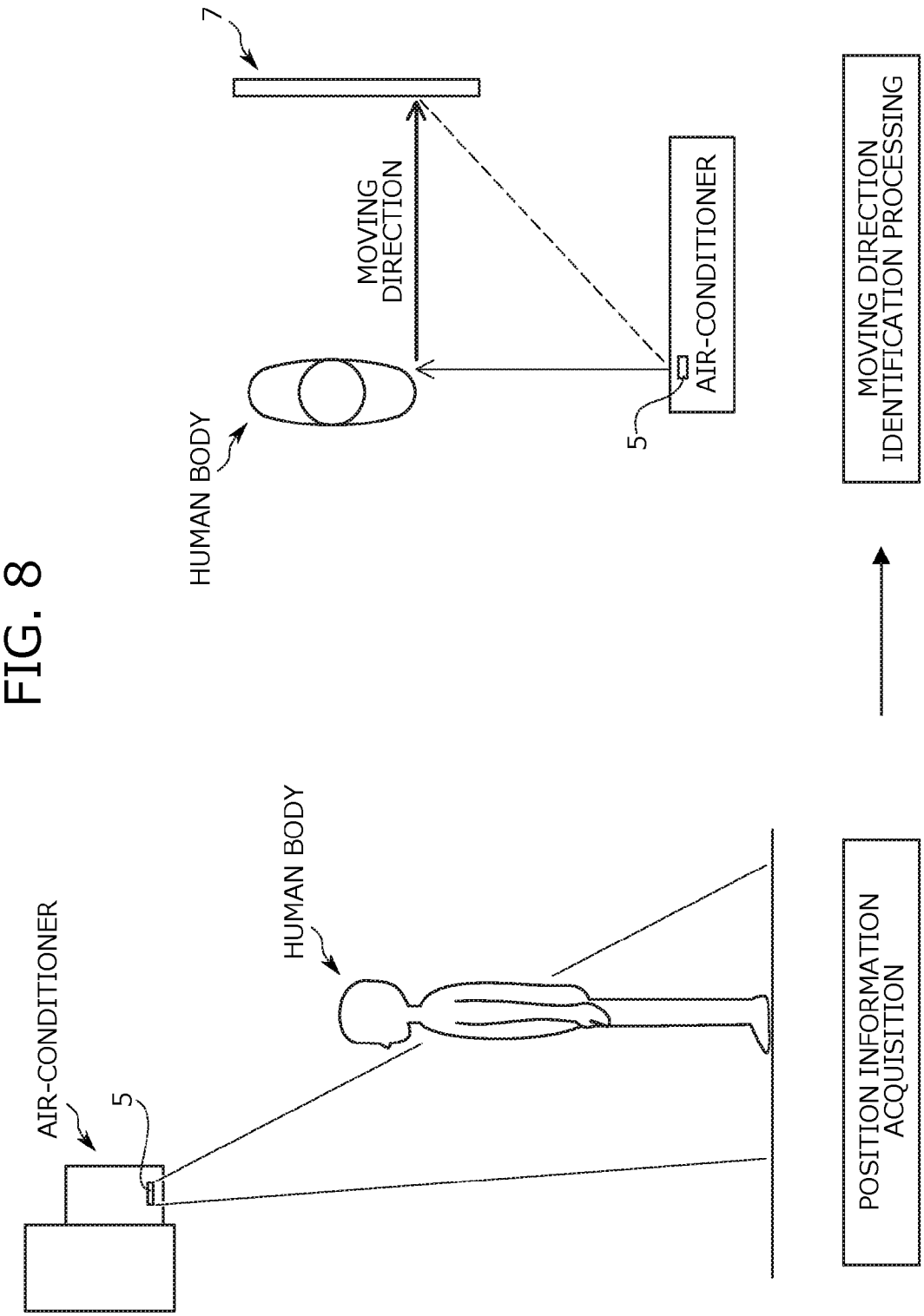

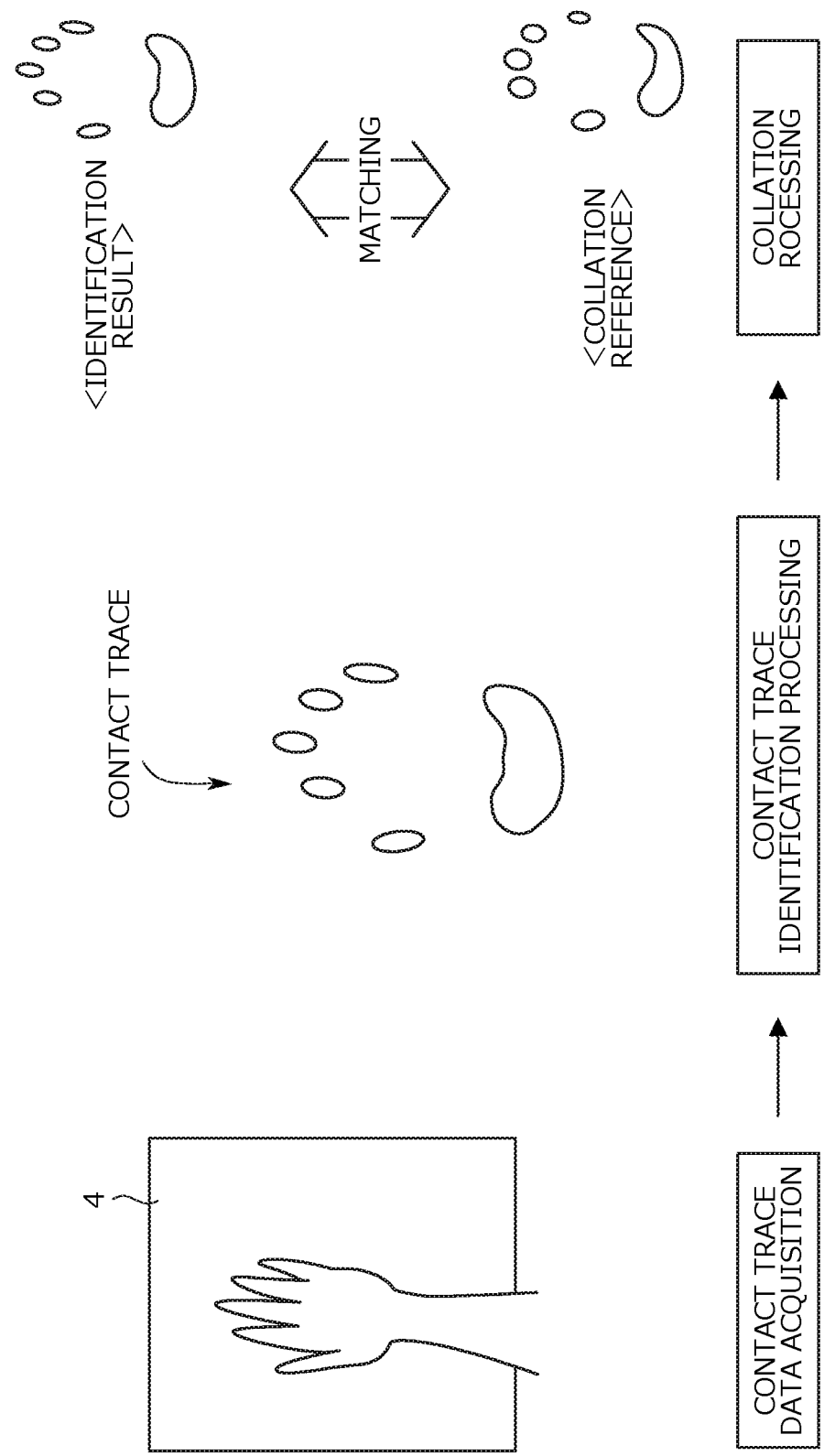

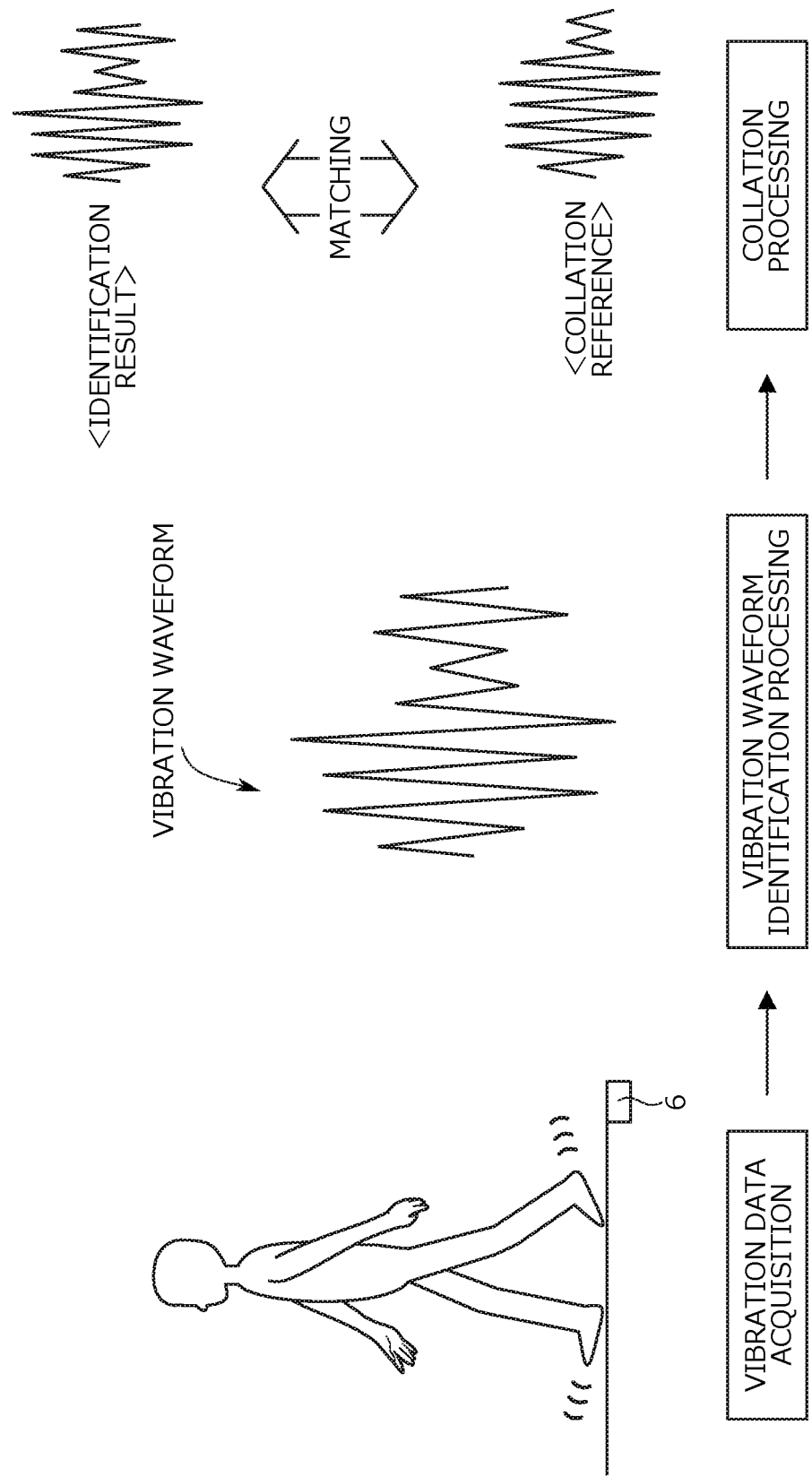

COMMUNICATION UNIT

CROSS REFERENCE TO RELATED APPLICATION

The present application claims priority to Japanese Patent Application No. 2014-068734, filed on Mar. 28, 2014, the entire content of which is herein incorporated by reference.

TECHNICAL FIELD

The present invention relates to a communication unit, and specifically to the communication unit that is used when a sender transmits at least one of his or her image information and speech information to a recipient.

BACKGROUND

The technique by which those at remote sites have a dialogue with each other while watching images has already been used for applications such as a teleconference, watching of a family and so forth. As a matter of course, a communication system introduced in order to realize such the remote dialogue is desired to be easily handled. Specifically, in cases where system users are elderly people and children, there is a risk that the dialogue using the communication system is unable to be appropriately utilized when complicated terminal operations are required for dialogue thereof.

The above-described problem is possible to be solved via application of the technique according to, for example, JP 2012-178621 A. The technique disclosed in JP 2012-178621 A relates to a video telephone apparatus. To be more specific, the video telephone apparatus is a video telephone apparatus for transmitting speech input from a microphone and images photographed by a camera to a speech opposite party with a communication control section. And, the feature of this apparatus is that, it comprises a human body detecting section that detects existence of users, and when the human body detecting section detects change in presence or absence of existence of users, a phone call mode in which speech and images are transmitted to a speech opposite party and a holding mode in which the speech and the images are not transmitted to the speech opposite party are switched for controlling.

According to the configuration as described above, automatic switching in response to existence or non-existence of users is performed, and thus special operations are not required for telephone conversation, thereby enabling to easily perform speech communication.

However, in the case of a configuration of switching of the phone call mode/the holding mode in response to detection results with the human body detecting section, even though a user, for example, has not been willing to perform speech communication, a phone call mode will be automatically performed when detecting existence of the user. The occurrence of such a malfunction results in images and speech of users which are to be transmitted against his or her will, leading to possibility of raising the following problems such as invasions of privacy, leakage of secret and so forth.

SUMMARY

Thus, the present invention is made in consideration of the above-described problem, it is an objective of the present invention to provide a communication unit which is easy to be handled by users, and is capable of preventing malfunction in which the communication is started against user's will, when communication for the purpose of remote dialogue is carried out.

According to the present invention, the foregoing problem is solved by a communication unit that is used when a sender transmits at least one of his or her image information and speech information to a recipient, the communication unit comprising an information acquisition device that acquires the at least one information; a communication terminal that transmits communication data indicating the at least one information acquired by the information acquisition device to a device possessed by the recipient; and a detection unit that detects an object to be detected which is generated or changed by an action of the sender, wherein the detection unit comprises multiple types of detection units provided so as to detect mutually different types of the objects each to be detected, and the communication terminal starts transmitting the communication data when each detection result from each of two or more types of the detection units satisfies a predetermined condition.

Multiple types of detection units that detect mutually different types of objects each to be detected are provided in the above-described configuration, and transmission of the communication data is started only if each detection result from two or more types of detection units among them satisfies a predetermined condition. Thus, in comparison to the configuration in which a detection result from a single detection unit is only used as a trigger to start transmitting the communication data, it becomes possible that the malfunction (which means that the communication is started against user's will) is more effectively suppressed.

Further, it is more preferable that as to the above-described communication unit, a first detection unit that detects existence of a person within a predetermined area is included in multiple types of the detection units, and the communication terminal starts transmitting the communication data when the first detection unit detects the sender positioned within the area, and the each detection result from each of two or more types of the detection units satisfies the predetermined condition. In the above-described configuration, while the detection result from the detection unit (the first detection unit) that detects existence of a person is used as a trigger for starting the communication, each detection results from two or more types of detection units is further used as a trigger. Thus, in comparison to the case where only a detection result from a detection unit that detects existence of a person is singly utilized, it becomes possible that the malfunction is more effectively suppressed.

Further, it is furthermore preferable that as to the above-described communication unit, a second detection unit that detects a direction of a visual line or face of the sender is included in multiple types of the detection units, and the communication terminal starts transmitting the communication data when the first detection unit detects the sender positioned within the area; the direction of the visual line or face of the sender detected by the second detection unit faces in a predetermined direction; and further, the each detection result from each of one or more types of the detection units satisfies the predetermined condition.

In the case of the above-described configuration, the direction of each of the visual line and the face is regarded as an object to be detected, and detection results from the objects each to be detected are used as a trigger for starting the communication. Herein, the direction of each of the visual line and the face direction is switched by reflecting user's will. For this reason, if the direction of each of the visual line and the face is used for a trigger for starting the communication, it becomes possible that the situation where the communication is started against user's will, that is to say, the malfunction is still more effectively suppressed.

Further, it is still more preferable that as to the communication unit further comprising a display screen forming section that makes up a part of building material, furniture or a decoration article disposed in a building where the sender is present, and forms a display screen of an image; the display screen forming section makes an external appearance as the part with no formation of the display screen in a period when the first detection unit detects no person positioned within the area to form the display screen only in the period when the first detection unit detects the person positioned within the area, and the communication terminal starts transmitting the communication data when the first detection unit detects the sender positioned within the area; the direction of the visual line or the face of the sender detected by the second detection unit is oriented to the display screen; and the each detection result from each of one or more types of the detection units satisfies the predetermined condition.

In the above-described configuration, it is conventionally used as a trigger for starting the communication that the display screen forming section that reveals an external appearance as the building material or the furniture forms a display screen, and the direction of each of the visual line and the face faces the display screen which has been formed. In this case, users (senders) come to switch the direction of each of the visual line and the face to start the communication by realizing that the display screen has been formed on the display screen forming section. Thus, user's will becomes possible to be more appropriately reflected for starting the communication, and it becomes possible that the malfunction is still more effectively suppressed.

Further, it is more preferable that as to the communication unit, a specified detection unit in which a collation reference collated with the detection results is stored is included in multiple types of the detection units, and the communication terminal starts transmitting the communication data when the first detection unit detects the sender positioned within the area, and a matching degree obtained in collating the collation reference with the detection results of the specified detection unit becomes equal to or more than a predetermined threshold.

In the above-described configuration, the communication is to be started, provided that a matching degree becomes equal to or more than a threshold by collating the detection results of a certain object to be detected with a collation reference thereof. Thus, it becomes possible that the malfunction is more effectively suppressed.

Further, it is still more preferable that as to the communication unit, the specified detection unit detects any of speech uttered by the sender, movement of a movable part in a sender's body, distance between a reference position and a present position of the sender, a moving direction of the sender, a contact trace generated by a part of the sender's body, and vibrations generated by a walking action of the sender.

In the above-described configuration, because considerably simple action and so forth which are performed by users are detected as objects each to be detected, no complex action is particularly required to the users when starting the communication. In other words, it becomes possible that users (senders) perform the communication (communication for the purpose of a dialogue) if the action taken during ordinary conversation is performed.

Further, it is more preferable that as to the communication unit, the communication terminal starts transmitting the communication data when data indicating that the recipient is in a space where the at least one information is possible to be received is received from the device possessed by the recipient, and the each detection result from each of two or more types of the detection units satisfies the predetermined condition.

In the above-described configuration, it is a prerequisite that a communication partner (a recipient) is present in a place where a dialogue is possible, based on starting the communication. Thus, since the communication is started in consideration of the present situation of the communication partner, it becomes possible that wasteful communication, that is to say, the situation where the communication is to be started despite the fact that the communication partner is absent is effectively suppressed.

It becomes possible that the malfunction by which the communication is started against user's will is appropriately suppressed by a communication unit according to the present invention when the communication for the purpose of remote dialogue is carried out. Further, it also becomes possible that users (senders) start the communication by performing the action taken during ordinary conversation without requiring a complex operation for starting the communication.

BRIEF DESCRIPTION OF THE DRAWINGS

FIG. 6 is an explanatory schematic diagram showing a speech detection processing;

FIG. 7 is an explanatory schematic diagram showing a hand action detection processing;

FIG. 8 is an explanatory schematic diagram showing a moving direction detection processing;

FIG. 9 is an explanatory schematic diagram showing a contact trace detection processing; and FIG. 10 is an explanatory schematic diagram showing a walking vibration detection processing.

DETAILED DESCRIPTION OF THE EMBODIMENTS

Next, one embodiment of the present invention (hereinafter, referred to as the present embodiment) will be explained referring to drawings.

The communication unit relating to the present embodiment is used for having a dialogue while dialoguers each who are present at mutually remote sites are looking at figures (images) of each other, and is used specifically in the present embodiment in such a manner that each dialoguer has a dialogue with a conversation opposite party at each person's home. In addition, applications of the communication unit are not limited to the above-described content, and may be used in order to have a dialogue with a person who is present at the site other than his or her home.

The communication units relating to the present invention each are installed at each dialoguer's home. The communication unit provided for each dialoguer has the same configuration provided between dialoguers. For this reason, as described below, the configuration will be explained by exemplifying a communication unit which has been installed at one dialoguer's home. The foregoing one dialoguer corresponds to "a sender", and means one who transmits his or her image or speech to an opposite dialoguer (that is to say, "a recipient") for having a dialogue. In addition, "the sender" and "the recipient" mean a relative concept, and a person which is a "sender" at one point in time can be a potential "recipient" at another point in time.

Figure 1:
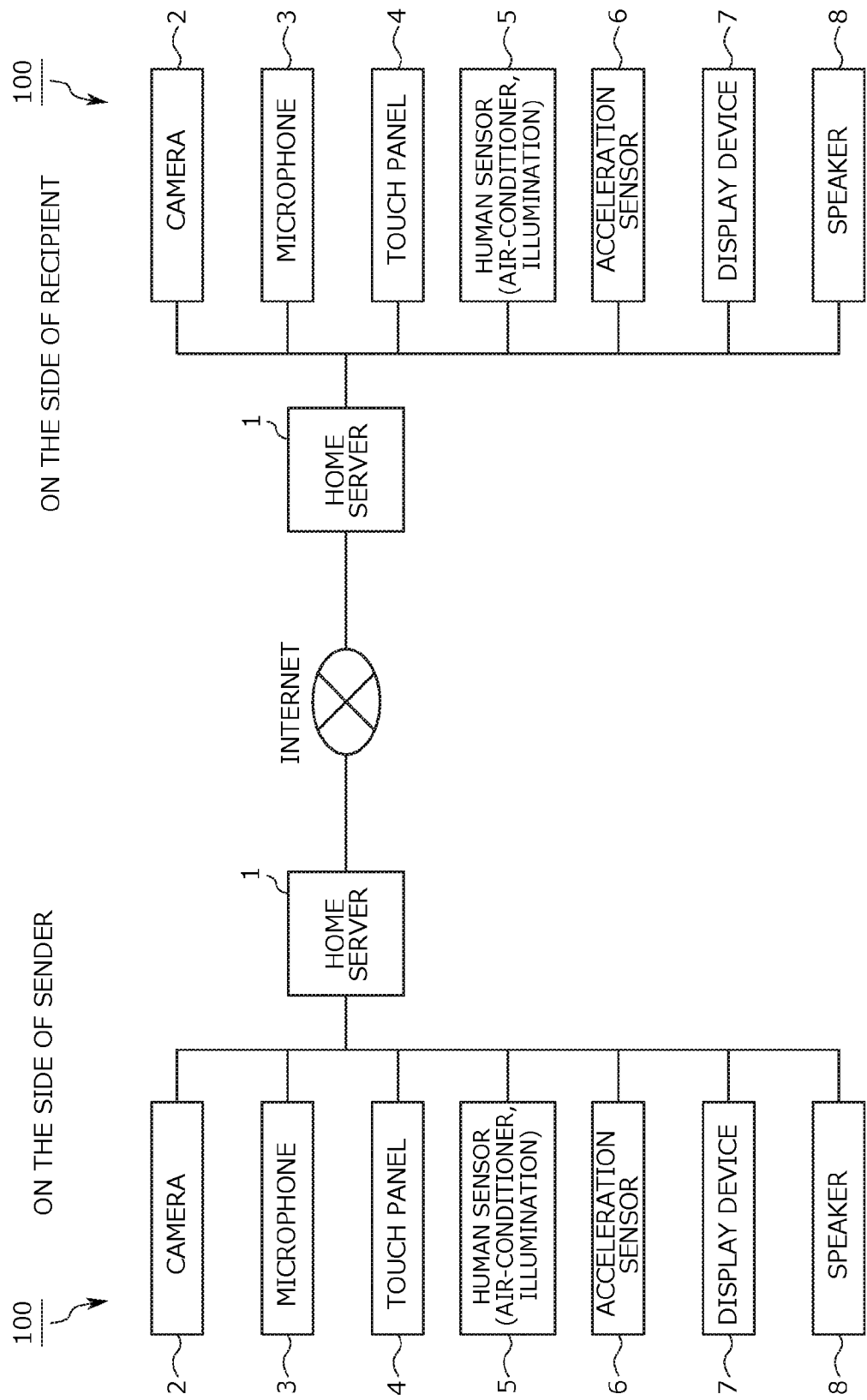
FIG. 1 is a diagram showing a configuration of the communication unit relating to one embodiment of the present invention.

A communication unit 100 is made from a device configuration as shown in FIG. 1, and to be more specific, it is composed of a home server 1 and peripherals connected to this server. The home server 1 is communicably connected to the home server 1 (corresponding to "a device possessed by a recipient") on the recipient side via a communications network such as internet and so forth, and communication data is transmitted and received between the same home servers 1. In more detail, the home server 1 is connected to a camera 2 and a microphone 3 as information acquisition devices, and receives image signals and speech signals output from these devices. Then, the home server 1 converts receiving signals into digital data, and transmits it as communication data to the home server 1 on the recipient side.

The camera 2 is one which photographs images of a sender, and the configuration is commonly known. Further, the microphone 3 is one which collects sound and speech uttered by the sender, and the configuration is commonly known.

In addition, both the camera 2 and the microphone 3 are provided in the case of the present embodiment, and the data obtained by superposing data indicating speech on data indicating an image, that is to say, a moving image data file is transmitted and received as communication data. However, this is not limited thereto, and it is preferred that at least one of the camera 2 and the microphone 3 can be provided. That is to say, the communication unit 100 may be one which is usable when the sender transmits at least one of his or her image information and speech information to the recipient. Similarly, the home server 1 may be one which transmits communication data indicating at least one of sender's image information and speech information to the home server 1 on the recipient side.

Further, a touch panel 4, a human sensor 5, and an acceleration sensor 6 as peripherals are connect to the home server 1. The touch panel 4 is used when the sender, for example, requests dialogue to the recipient, and accepts the operation (in a strict sense, a touch operation) done by the sender when starting a dialogue. The touch panel 4 that has accepted a touch operation done by a sender outputs the predetermined signal to the home server 1 in response to acceptance of the touch operation.

The human sensor 5 corresponds to a detection unit (that is to say, "the first detection unit" of the present invention) that detects existence of a person in the detection area, and is placed at sender's home, more strictly, in the room where the sender is present when the sender has a dialogue using the communication unit 100 (hereinafter, referred to as a dialogue executing room). In other words, the indoor space of the dialogue executing room has been set in advance as a detection area of the human sensor 5, and when the sender is present in the indoor space, an electrical signal that indicates the foregoing matter is continuously output from the human sensor 5 to the home server 1.

The human sensor 5 relating to the present embodiment detects existence of a person in the detection area, and is provided with a function of identifying the position of the person. That is to say, presence or absence of a person in the dialogue executing room is determined by analyzing the output signal output from the human sensor 5, and it is possible that the position of a person thereof is identified in cases where a person has been presented.

In addition, the human sensor 5 relating to the present embodiment is an attachment device installed in home appliances (for example, an air-conditioner) placed in the dialogue executing room. However, this is not limited to thereto, and the foregoing sensor may be arranged to be independently set as a single device.

The acceleration sensor 6 is placed on a hallway floor connected to the dialogue executing room; grasps the vibration generated when a person is walking on the floor; and outputs data depending on waveforms of the vibration (hereinafter, referred to as vibration data) to the home server 1. Accordingly, when the sender who is present outside of the dialogue executing room walks toward the dialogue executing room in order to have a dialogue, the vibration generated at this time is grasped by the acceleration sensor 6, thereby outputting the above-described vibration data to the home server 1.

Further, when the home server 1 receives the communication data obtained from the home server 1 on the recipient side, in a strict sense, the moving image file data indicating recipient's image and speech, the same data as described above is loaded, thereby outputting information indicated by this to an output device.

To be more specific, a display device 7 as a display screen forming device and a speaker 8 as a speech reproduction device are connected to the home server 1. The home server 1 displays the recipient's image (in a strict sense, an image photographed by the camera 2 on the recipient side) on the display screen of the display device 7 by loading the communication data which has been received from the home server 1 on the recipient side. Concurrently with this, the home server 1 further reproduces recipient's speech (in a strict sense, sound collected by the microphone 3 on the recipient side) with the speaker 8.

In addition, as to the present embodiment, in the display device 7, the foregoing touch panel 4 is used at the part where a display screen is formed. Further, the display device 7 relating to the present embodiment which is situated at a normal time in a building where the sender is present serves as, in more detail, a decoration article disposed in the dialogue executing room, or specifically serves as a full-length mirror, and becomes one which forms a display screen only when having a dialogue.

Figure 2B:
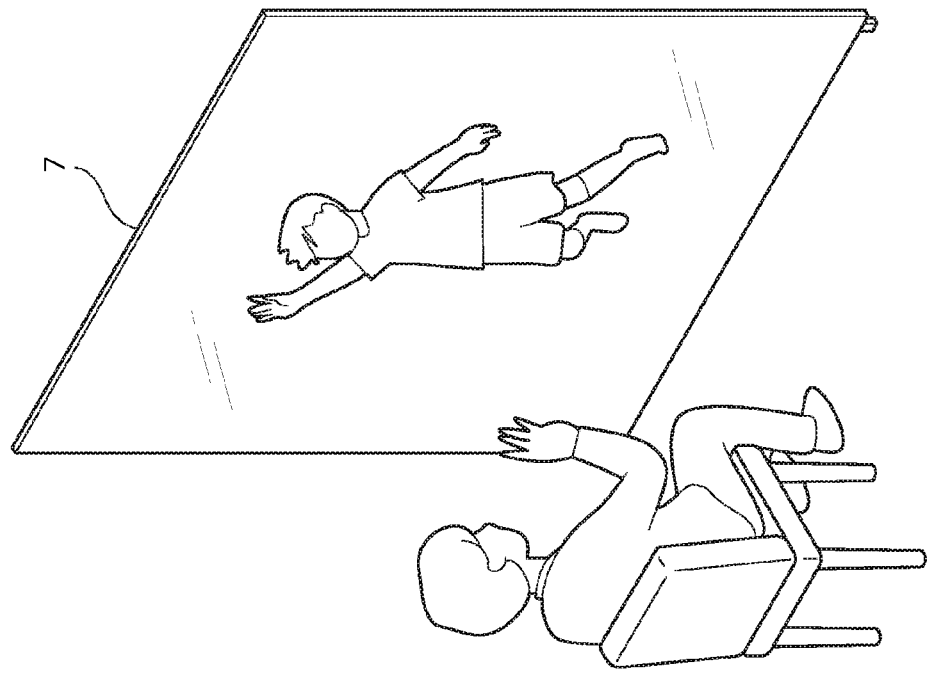
FIG. 2A and FIG. 2B are diagrams showing one example of the display screen forming section of the present invention.
Figure 2A:
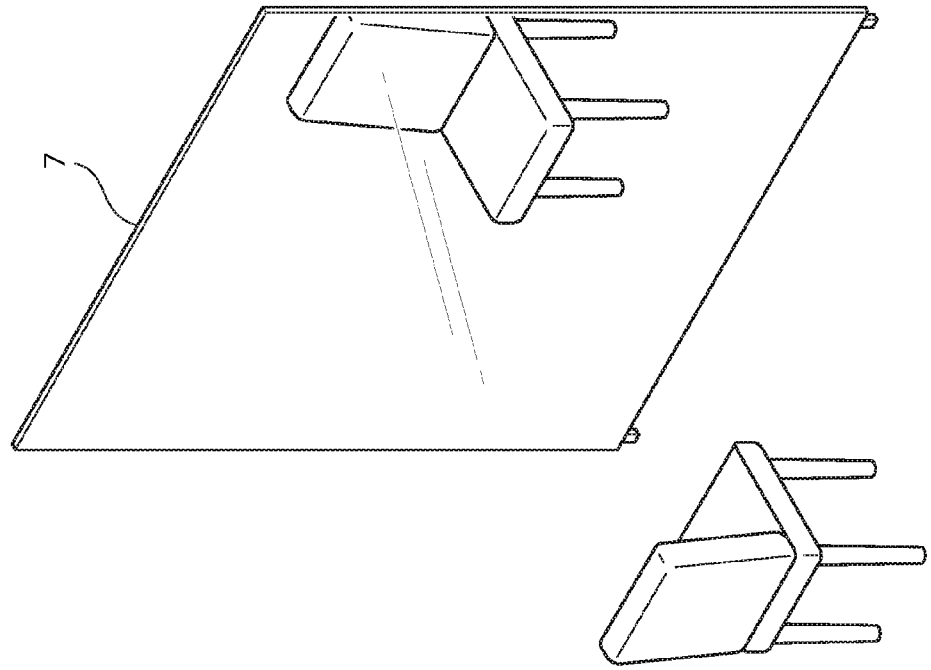

Further explanation will be specifically made referring to FIG. 2A and FIG. 2B, and the display device 7 relating to the present embodiment is composed of a part of the full-length mirror disposed in the dialogue executing room of sender's residence, or specifically composed of a mirror part. Then, as shown in FIG. 2A, the present display device 7 reveals an external appearance as a mirror part with no formation of the display screen in a period when not having a dialogue (at a normal time).

On the other hand, the above-described display device 7 comes to form the display screen as shown in FIG. 2B when the sender has a dialogue. To be more specific, the home server 1 finds the position of a sender based on the output signal output from the human sensor 5 when the sender is present in the dialogue executing room. When the position of the sender which has been found is at a predetermined position (for example, the position in front of the display device 7), the home server 1 further outputs a display screen forming instruction to the display device 7. The display device 7 that receives this instruction comes to form a display screen at the portion where a mirror has been constituted so far. Then, the recipient's image comes to be displayed on the display screen which has been formed.

As to the present embodiment described above, the display screen for the image display is composed of the display device 7 concurrently serving as a full-length mirror, and formation/erasure of the display screen is possible to be freely switched. Then, when a person is absent in the dialogue executing room (in other words, in the period when the human sensor 5 is not detecting the person in the detection area), the display device 7 does not form the display screen, but reveals an external appearance as a part of the full-length mirror. That is to say, the display device 7 relating to the present embodiment forms the display screen only in the period when the human sensor 5 is detecting existence of the person in the detection area.

The existence of the display screen is difficult to be noticed at a normal time (during No conversation is performed) by the above-described action, and the display device 7 becomes possible to be effectively utilized as an interior. In addition, as to a configuration of the full-length mirror concurrently serving as a display, commonly known configurations are usable as seen from the configuration which has been disclosed in WO 2009/122716.

Incidentally, the display device 7 is possible to be used with no limitation as long as to the full-length mirror concurrently serving as a display; it makes up a part of building material, furniture or a decoration article disposed at sender's home; and formation/erasure of the display screen is possible to be freely switched. For example, a part of building material constituting doors and inner walls of the building or furniture such as a chest of drawers and so forth may be used as the above-described display.

In addition, as to the display device 7, it is not limited to those in which formation/erasure of the display screen can be freely switched, and a conventional display device is used for it.

Next, the home server 1 described above will be described in detail. The home server 1 is a computer constituting, namely, a home gateway, and is provided with a memory composed of CPU, ROM and RAM, a hard disk drive, an interface and an I/O port for communication. Further, various kinds of programs are stored in the memory.

Figure 3:
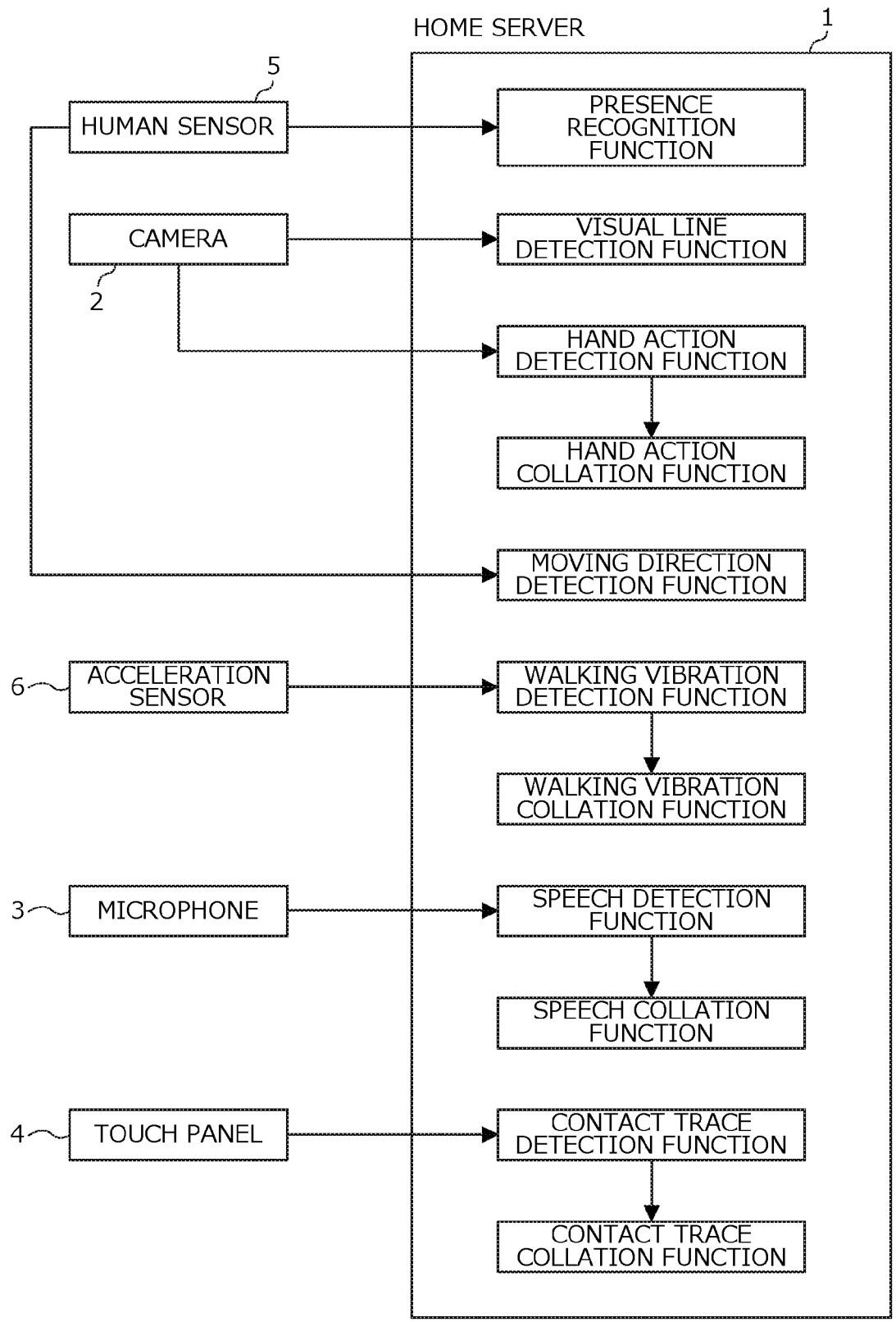
FIG. 3 is a list drawing showing functions installed in the communication terminal relating to one embodiment of the present invention.

To describe the functions of the home server 1, and the above described functions are installed, that is to say, the function of data communication, the function of generating communication data indicating sender's image and speech, and the function of displaying the image and reproducing the speech by loading the received communication data. In the present embodiment, additional functions as shown in FIG. 3 in addition to these functions are installed in the home server 1. In addition, programs stored in the memory of the home server 1 are read by CPU to be expected to execute each of the additional functions, but a specific technique (technical procedure) which is commonly known is possible to be utilized.

Next, each of additional functions of the home server 1 will be described.

1) Presence Recognition Function

When a human sensor 5 detects that a person is present in the dialogue executing room, the home server 1 recognizes existence of a person in the dialogue executing room based on the output signal output from the human sensor 5.

2) Visual Line Detection Function

Image signals acquired from the camera 2 are subjected to an image processing, and a person as an object, that is to say, the image of sender's face is extracted. Then, the position and size of the pupil in the face (in a strict sense, the position and area ratio of the pupil with respect to an eyeball), and so forth are found to detect the direction of a visual line of a sender. That is to say, the home server 1 is configured so as to make a detection unit that detects the visual line of the sender (corresponding to "the second detection unit" according to the present invention) to work in cooperation with the camera 2. Incidentally, in addition to detecting the direction of visual line of the sender from the image signal acquired from the camera 2, or in place of detecting the direction of the visual line, the direction of sender's face may be detected.

3) Hand Action Detection Function

A motion capture technique is applied to the image signal acquired from the camera 2, and hand motion of a sender as an object, more specifically, the motion trajectory of a part to be identified, the part which has been set in the hand, is detected. That is to say, the home server 1 is configured so as to make a detection unit that detects hand motion of the sender to work in cooperation with the camera 2, and further, "a specified detection unit" is configured so as to use the present function in combination with the after-mentioned hand action collation function. Herein, "a specified detection unit" means one which collates the collation reference with the detection results when detecting an object to be detected.

In addition, in the present embodiment, hand motion of the sender is set to be detected, but as to the detection object, movement of a movable part in sender's body may be preferable, and parts other than hands, for example, movement of legs may also be allowed to be detected. However, the action conventionally performed by a sender when having a dialogue or the equivalent thereof is preferable, and in this respect, it is reasonable that hand motion is regarded as a detection object.

4) Hand Action Collation Function

A hand motion reference (corresponding to "collation reference") which has been predetermined is collated with the hand motion (in a strict sense, a motion trajectory of hand) detected by the hand action detection function, and thus it means a function of evaluating a matching degree thereof. In addition, the hand motion reference has been made into data, and stored in a memory of the home server 1. Herein, the hand motion taken as the reference is preferably a simple action taken in ordinary conversation, for example, a rotational operation (a hand waving action) or a knocking action within a predetermined area.

5) Moving Direction Detection Function

The output signal output from the human sensor 5 is analyzed to identify the position of a person (a sender) in the dialogue executing room, and the moving direction of the above-described person is further detected based on change in position which has been identified. To be more specific, the direction at the time when looking at the person from the human sensor 5 (hereinafter, simply referred to as "the direction to a person") is found. Similarly, the direction at the time when looking at the predetermined position of the dialogue executing room from the human sensor 5 (for example, a setting position of the display device 7), that is to say, the reference direction is calculated. The moving direction of a person is detected from the relationship between the reference direction and the direction to the person. As described above, the home server 1 is configured so as to make a detection unit that detects the moving direction of a sender to work in cooperation with the human sensor 5. Incidentally, in addition to detecting the moving direction of a person, or in place of detecting the moving direction of a person, the position of a person in the dialogue executing room may be detected.

6) Walking Vibration Detection Function

The vibration data acquired from the acceleration sensor 6 is analyzed, and the vibration generated when a person is walking on a hallway floor connected to the dialogue executing room is detected to specifically calculate waveforms of the vibration. That is to say, the home server 1 is configured so as to make a detection unit that directs the vibration generated by a walking action of the sender to work in cooperation with the acceleration sensor 6, and specifically, "a specified detection unit" is configured so as to use the after-mentioned walking vibration collation function in combination with the present function.

7) Walking Vibration Collation Function

A reference waveform (corresponding to "collation reference") which has been arranged to be set in advance is collated with waveforms of the vibration detected by the walking vibration detection function, and thus it means a function of evaluating a matching degree thereof. In addition, the reference waveform has been made into data, and stored in a memory of the home server 1. Herein, as to the reference waveform, a plurality of patterns at the time when approaching the display device 7 after entering the dialogue executing room (for example, patterns for each resident or each walking speed) are arranged to be prepared, and the reference waveform for each pattern may be provided.

8) Speech Detection Function

A speech recognition technique is applied to the speech signal acquired from the microphone 3, and the content of speech indicated by the speech signal, that is to say, words uttered by a sender are detected. That is to say, the home server 1 is configured so as to make a detection unit that detects sender's speech to work in cooperation with the microphone 3, and specifically, "a specified detection unit" is configured so as to use the after-mentioned speech collation function in combination with the present function.

9) Speech Collation Function

A reference word (corresponding to "collation reference") which has been registered in advance is collated with the content of speech detected by the speech detection function, and thus it means a function of evaluating a matching degree thereof. In addition, the reference word has been made into data, and stored in a memory of the home server 1. Herein, as to the reference word, words conventionally used when starting the conversation (for example, words spoken to call or words for greetings), or words each which represents a name of a conversation opposite party or relationship are preferable for the forgoing reference word.

10) Contact Trace Detection Function

The output signal output from the touch panel 4 is analyzed to detect a contact pattern at the time when a sender has touched the touch panel 4. Herein, the contact pattern means a fingerprint mark (corresponding to a contact trace) which remains on a panel when the sender has touched the touch panel 4. That is to say, the home server 1 is configured so as to make a detection unit to work in cooperation with the touch panel 4, the foregoing detection unit that detects a contact trace formed via sender's hand brought into contact with the touch panel 4, and specifically, "a specified detection unit" is configured so as to use the after-mentioned contact trace collation function in combination with the present function.

11) Contact Trace Collation Function

A reference pattern (corresponding to "collation reference") which has been registered in advance is collated with a contact pattern detected by the contact trace detection function, and thus it means a function of evaluating a matching degree thereof. In addition, the reference pattern has been made into data, and stored in a memory of the home server 1. Herein, the reference pattern means a pattern at the time when the touch panel 4 has been touched with one's palm, and may be provided for each resident living at sender's home.

As described above, in the present embodiment, the human sensor 5 is provided as a single detection unit, and the home server 1 works in cooperation with peripherals, thereby serving as a plurality of detection units. Herein, the detection unit means one that detects an object to be detected, which is generated or changed by an action of the sender. The objects each to be detected by each of the human sensor 5 and the home server 1 are different in type from each other. In other words, in the present embodiment, multiple types of detection units are to be provided so as to detect mutually different types of the objects each to be detected.

Then, in the present embodiment, at least two types of detection units of the above-described multiple types of the detection units are to detect the corresponding objects each to be detected when transmitting the communication data to the home server 1 on the recipient side, that is to say, when starting the communication for the purpose of a dialogue. That is to say, the home server 1 relating to the present embodiment is to start transmitting the communication data when it is used as a trigger (a start condition) that each detection result from each of two or more types of the detection units satisfies a predetermined condition. Thus, for example, in comparison to the configuration in which the transmission of communication data is started on only condition that the human sensor 5 detects existence of a person in the dialogue executing room, it becomes possible that the malfunction which starts communication against sender's will is more effectively suppressed.

Further, the object to be detected of each detection unit is one resulting from a comparatively simple action or behavior conventionally taken when a sender starts having a dialogue (for example, hand waving action, call/greeting, moving action or the like). For this reason, since the action or behavior may be conventionally taken when a sender starts having a dialogue, no particular complicated operation needs to be performed, and thus it becomes possible that the communication for the purpose of a dialogue is easily started.

Figure 4A:
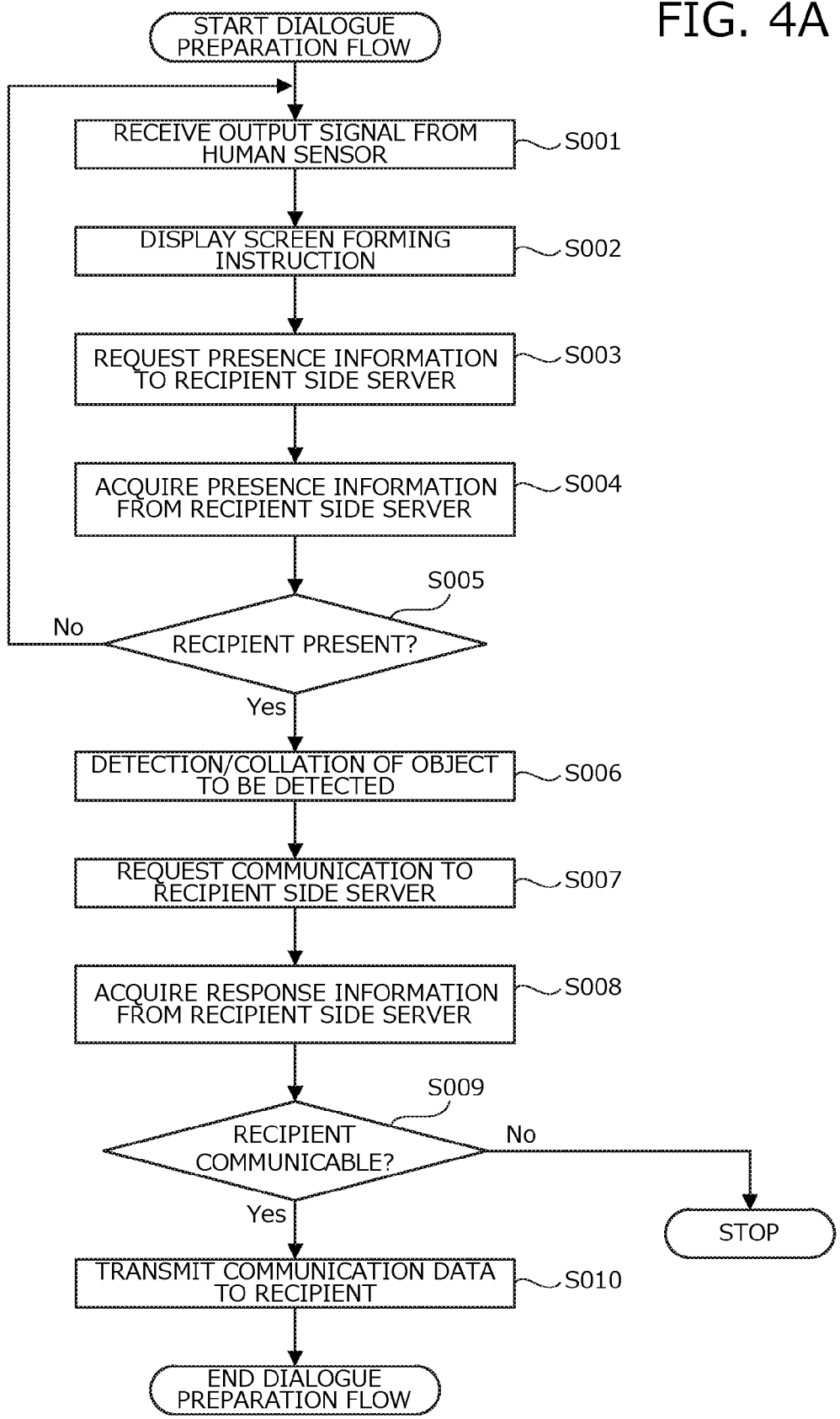
FIG. 4A is a diagram showing a flowchart for preparing dialogue.
Figure 4B:
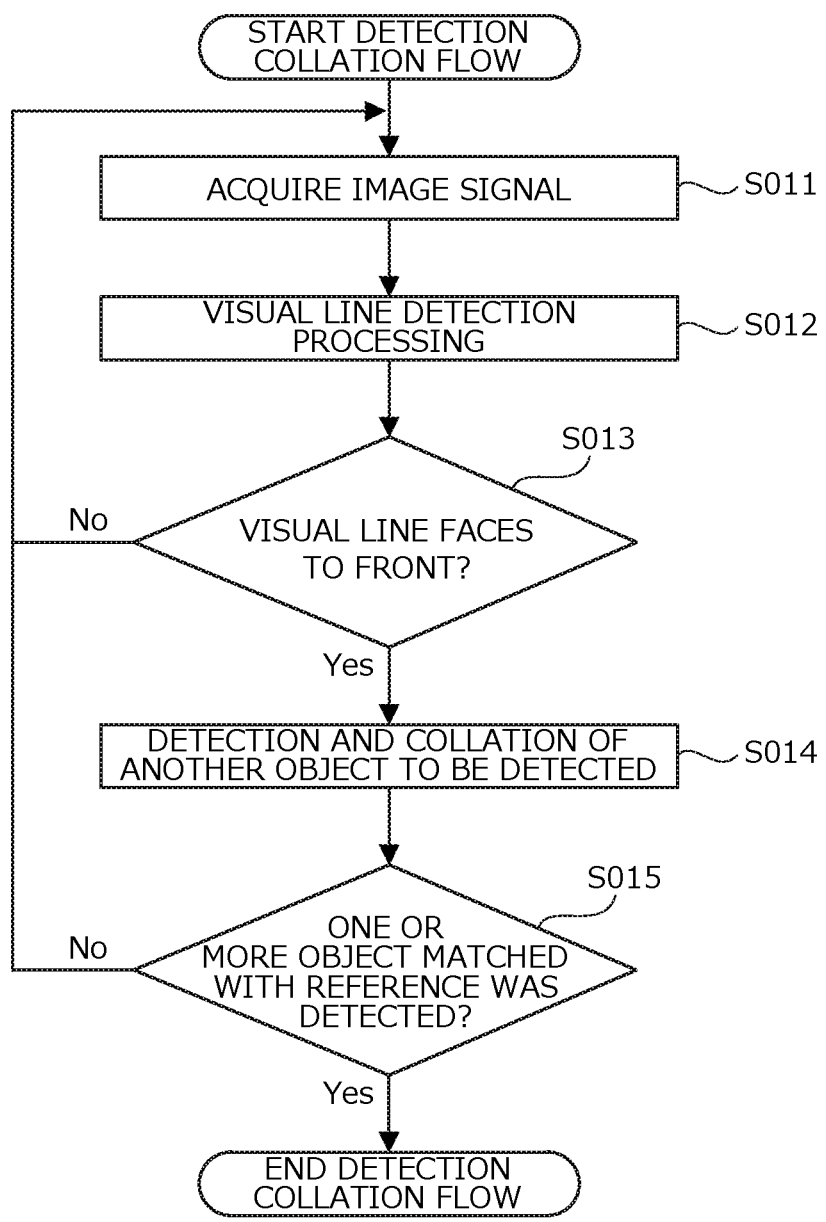
FIG. 4B is a diagram showing a flowchart for detection collation.

Next, the dialogue preparation flow with regard to a processing carried out as a start condition of the communication for the purpose of a dialogue will be described along with procedures shown in FIG. 4A and FIG. 4B. In addition, in the following explanation, the home server 1 means the home server 1 on the side of a sender, unless otherwise specified.

The dialogue preparation flow starts with a point at which a sender enters the dialogue executing room to start the communication for the purpose of the dialogue. When the sender enters the dialogue executing room, the human sensor 5 accordingly detects the sender who is positioned in the same room. That is to say, the human sensor 5 as a detection unit outputs a signal indicating the detection results by detecting the sender in the predetermined detection area as a detection condition, and the home server 1 receives the same signal (S001).

On the other hand, the sender who has entered the dialogue executing room approaches the display device 7 when starting the communication for the purpose of a dialogue. In this period, the home server 1 calculates the position of the sender based on the output signal output from the human sensor 5. Then, when the sender moves to the position in front of the display device 7, the home server 1 outputs the display screen forming instruction to the display device 7 based on recognition of the foregoing matter (S002). The display device 7 that receives this instruction comes to make a transition from the state where an external appearance as a full-length mirror is revealed up to the state where a display screen is formed onto the front face.

In this way, when the sender approaches the display device 7 to start the communication for the purpose of a dialogue, the state of the display device 7 (in a strict sense, outer appearance) is designed to be switched as the responding action. The sender is to take a subsequent action (an action for starting the communication) by realizing change of such the state. Thus, it becomes possible that user's will is adequately reflected for starting the communication, and it becomes possible that the malfunction is still more effectively suppressed.

Next, the home server 1 requests to transmit presence information to the home server 1 on the side of a recipient (hereinafter, referred to as the recipient side server) (S003). Herein, the presence information means information indicating that a recipient is present in the space where it is possible that a recipient receives sender's image and speech, in plain words, information indicating whether or not the recipient is present in the dialogue executing room of his or her home.

The recipient side server produces the data in which the presence information is stored to transmit it to the home server 1 when receiving a request from the home server 1. The home server 1 acquires the presence information from the recipient side server by receiving the data (S004).

When acquiring presence information indicating that the recipient is present in the room (Yes at S005), the home server 1 performs the subsequent steps (from S006 onward). On the other hand, when acquiring the presence information indicating that a recipient is absent, the home server 1 stands by until it acquires the presence information indicating that a recipient is present, and withholds the communication for the purpose of a dialogue. In this way, in the present embodiment, when starting the communication for the purpose of a dialogue, it is necessary that a communication partner (a recipient) is present in a place where a dialogue is possible, based on starting the communication for the purpose of a dialogue. That is to say, the communication for the purpose of a dialogue is started in consideration of a presence situation of the communication partner, and thus it becomes possible that wasteful communication, that is to say, the situation where the communication is to be started despite the fact that the communication partner is absent is effectively suppressed.

The home server 1 subsequently works in cooperation with peripherals to detect a plurality of objects each to be detected, and further performs a processing of collating some of the detection results with a collation reference (S006). The flow of this processing will be described referring to FIG. 4B, and first, the home server 1 acquires an image signal indicating the image of a sender who is standing in front of the display device 7 from the camera 2 (S011). In addition, the camera 2 is placed at the position where it becomes possible that the image of a whole body including sender's face is photographed, for example, placed so as to photograph the sender through a display screen on the back side of the display screen of the display device 7.

Figure 5:
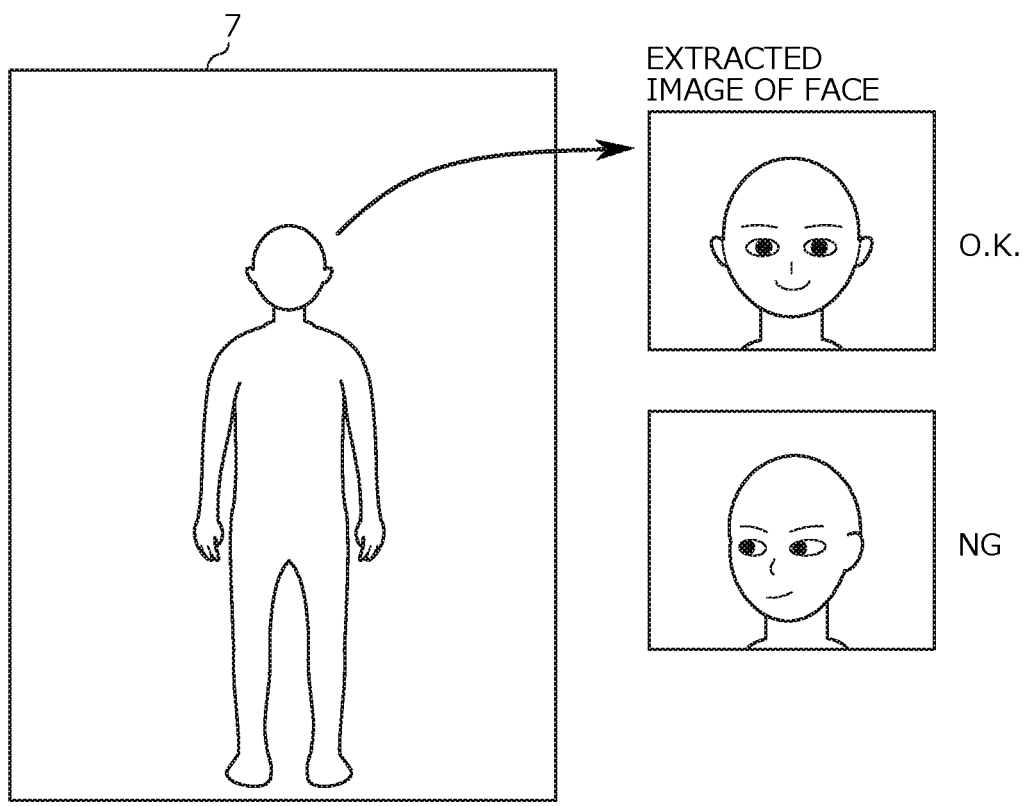
FIG. 5 is an explanatory schematic diagram showing a view line detection processing.

The home server 1 that has acquired the image signal detects the direction of a visual line of a sender with the foregoing visual line detection function (S012). Then, the home server 1 determines whether or not the visual line of the sender which has been detected faces in a predetermined direction (S013). To be more specific, as shown in FIG. 5, the home server 1 identifies the visual line of the sender with respect to the display screen formed on the display device 7. Then, in cases where the visual line of the sender faces the front with respect to the display screen, the home server 1 performs the subsequent steps. In contrast, in cases where the visual line of a sender faces a part other than the front with respect to the display screen, the home server 1 withholds the communication for the purpose of a dialogue until the visual line comes to face the front.

As described above, the home server 1 detects the visual line of a sender when starting the communication for the purpose of a dialogue, and it is a prerequisite for starting the communication that the direction of a visual line which has been detected satisfies a predetermined condition, and specifically faces the front with respect to the display screen.

In addition, in cases where the direction of sender's face is detected in combination with the direction of visual line of a sender, or in place of the direction of the visual line, as with the case of the visual line, it may be set to be a prerequisite for starting the communication that sender's face faces the front with respect to the display screen.

Afterwards, the home server 1 subsequently detects another object to be detected, and collates a collation reference with the detection results (S014). To be more specific, the home server 1 relating to the present embodiment detects speech uttered by a sender, hand motion of a sender, a moving direction of the sender, a contact pattern which has been formed when sender's hand has touched the touch panel 4, and the vibration generated by a walking action taken by a sender. Next, the method of detecting each of objects to be detected will be described referring to FIGS. 6-10.

(Speech Detection Processing)

The home server 1 detects sender's speech by the foregoing speech detection function. The specific procedures are illustrated as shown in FIG. 6. First, a speech signal is acquired from the microphone 3, and next, the content of speech indicated by the speech signal, that is to say, a word uttered by the sender is detected (recognized) by applying a speech recognition technique to the speech signal. Herein, the process of word recognition is one in which a conventional word recognition technique is utilized employing an acoustic model and a language model.

Then, the home server 1 determines whether or not the speech which has been detected (that is to say, a recognition word) to satisfies the condition which has been registered in advance, using the foregoing speech collation function. To be more specific, as shown in FIG. 6, the home server 1 reads a reference word stored in own memory to collate the detected recognition word with the same reference word. Then, when a matching degree between both of them has exceeded a predetermined threshold, the home server 1 identifies the detected speech as "a matching object".

(Hand Action Detection Processing)

The home server 1 detects hand motion of a sender by the foregoing hand action detection function. The specific procedures are illustrated as shown in FIG. 7. First, an image signal is acquired from the camera 2, and next, the motion trajectory of sender's hand is detected (calculated) by applying a motion capture technique to the image signal. Then, the home server 1 determines whether or not the hand motion which has been detected satisfies a predetermined condition, using the foregoing hand motion collation function. To be more specific, as shown in FIG. 7, the home server 1 reads a reference trajectory (hand motion which becomes a collation reference) stored in own memory to collate the hand motion trajectory which has been detected with the same reference trajectory. Then, when a matching degree between both of them has exceeded a predetermined threshold, the home server 1 identifies the detected hand motion as "a matching object".

(Moving Direction Detection Processing)

The home server 1 detects the moving direction when the sender moves in the dialogue executing room, using the foregoing moving direction detection function. The specific procedures are illustrated as shown in FIG. 8, and the position of a sender in the dialogue executing room is first identified by analyzing the output signal output from the human sensor 5 to further detect (identify) the moving direction of the sender based on change of the position which has been identified. Then, the home server 1 determines whether or not the moving direction which has been detected satisfies a predetermined condition, or specifically whether or not it becomes the direction to the display device 7. Then, when the moving direction which has been detected becomes the direction to the display device 7, the home server 1 identifies the detected moving direction as "a matching object".

In addition, in cases where the position of a sender is detected in combination with a moving direction of the sender, or in place of the moving direction, whether or not the position which has been detected is within a predetermined distance from a reference position (for example, the arrangement position of the display device 7) may be determined. Then, when this condition is satisfied, the position of the sender which has been detected may be identified as "a matching object".

(Contact Trace Detection Processing)

The home server 1 detects a contact pattern formed when a sender touches the touch panel 4 with one's palm, using the foregoing contact trace detection function. The specific procedures are illustrated as shown in FIG. 9, and the output signal output from the touch panel 4 is first analyzed to detect (identify) the contact pattern from the analysis results. Then, the home server 1 determines whether or not the contact pattern which has been detected satisfies a predetermined condition, using the foregoing contact trace collation function. To be more specific, as shown in FIG. 9, the home server 1 reads a reference pattern stored in own memory to collate the contact pattern which has been detected with the same reference pattern. Then, when a matching degree between both of them has exceeded a predetermined threshold, the home server 1 identifies the detected contact pattern as "a matching object".

(Walking Vibration Detection Processing)

The home server 1 detects the vibration generated by walker's walking action, using the foregoing walking vibration detection function. The specific procedures are illustrated as shown in FIG. 10. First, the vibration data is received from the acceleration sensor 6, and next, the vibration data is analyzed to detect (identify) the waveform of walking vibration. Then, the home server 1 determines whether or not the vibrating waveform which has been detected satisfies a predetermined condition, using the foregoing walking vibration collation function. To be more specific, as shown in FIG. 10, the home server 1 reads a reference waveform stored in own memory to collate the walking vibration which has been detected with the same reference waveform. Then, when a matching degree between both of them has exceeded a predetermined threshold, the home server 1 identifies the detected walking vibration as "a matching object".

As described above, the home sever 1 relating to the present embodiment is arranged to detect the above-described five objects each to be detected in addition to the direction of visual line of a sender. However, the foregoing matter is not limited to the configuration in which all of the above-described five objects each to be detected are detected, but it may be allowed to be detected by selecting at least one of the above-described five objects each to be detected.

Then, when at least one of the above-described five objects each to be detected becomes a matching object (S015), the home server 1 terminates the detection collation flow. After terminating the detection collation flow, the home server 1 requests starting of the communication, that is to say, transmission of the communication data, to the recipient side server (S007).

The recipient side server produces the data indicating the response information when receiving the request to transmit it to the home server 1. The home server 1 acquires the response information by receiving the above-described data from the recipient side server (S008), and determines whether or not the recipient is in a communicable state, from this response information (S009). To be more specific, a series of steps described above, that is to say, the dialogue preparation flow and the detection collation flow are executed also on the side of a recipient. Then, when the start condition for the communication for the purpose of a dialogue on the side of a recipient is entirely satisfied (that is to say, when detecting the object to be detected, which has been arranged to be set and the detection results are matching with the collation reference), the response information indicating that the recipient is communicable is to be transmitted to the home server 1.

When it is determined from the response information which has been acquired that the recipient is in the communicable state, the home server 1 starts the communication for the purpose of a dialogue and is arranged to transmit the communication data indicating his or her image and speech to the recipient (S010). At this point of time, the dialogue preparation flow ends, and after this, the communication for the purpose of a dialogue is continuously performed until the operation in which one of the sender and the recipient terminates the communication (for example, an action of taking a predetermined distance or more away from the display device 7) is conducted.

Up to the above-described, the communication unit according to the present invention has been described taking an example thereof, but the above-described embodiment is merely an example for easily understanding the present invention, and the present invention is not limited to the above-described embodiment. Modifications and variations to the present invention can be made without departing from the spirit, and it goes without saying that the present invention includes the equivalent thereof.

Further, in the above-described embodiment, existence of a sender in the dialogue executing room, the direction of visual line or the face of the sender, speech uttered by the sender, movement of a movable part in a sender's body, the distance between a reference position and a present position of the sender, a moving direction of the sender, a contact trace formed when a part of the sender's body has touched the touch panel 4, and vibrations generated by a walking action of the sender each are set to be an object to be detected. Then, in the above-described embodiment, (X1) "The human sensor 5 detects the existence of a sender in the dialogue executing room"; (X2) "The direction of the visual line or the face of the sender detected by the home server 1 faces in a predetermined direction"; and additionally, (X3) "The each detection result from one or more types of detection units satisfies a predetermined condition" are set to be a start condition for the communication for the purpose of a dialogue (a trigger). However, the invention is not limited thereto, and as to the object to be detected, those other than the above-described objects each to be detected may be added therein. Further, the start condition for the communication for the purpose of a dialogue is not limited to the case of satisfying all of the above-described three conditions X1, X2 and X3, and may satisfy at least two conditions of the above-described three conditions X1, X2 and X3.

REFERENCE SIGNS LIST

1: Home server
2: Camera
3: Microphone
4: Touch panel
5: Human sensor
6: Acceleration sensor
7: Display device
8: Speaker
100: Communication unit

The invention claimed is:

1. A communication unit that is used when a sender transmits at least one information of image information and speech information of the sender to a recipient, the communication unit comprising:
    an information acquisition device that acquires the at least one information;
    a communication terminal that transmits communication data indicating the at least one information acquired by the information acquisition device to a device possessed by the recipient; and
    a detection unit that detects objects to be detected that is generated or changed according to an action of the sender, wherein:
        the detection unit comprises multiple types of detection units provided to detect mutually different types of the objects to be detected,
        the multiple types of detection units have a first detection unit that detects existence of a person within a predetermined area, and a specified detection unit in which a collation reference is stored,
        the specified detection unit detects any of distance between a reference position and a present position of the sender, a moving direction of the sender, a contact trace generated by a part of the sender's body, and vibrations generated by a walking action of the sender, and
        the communication terminal starts transmitting the communication data when the first detection unit detects the sender positioned within the predetermined area, and a matching degree obtained in collating the collation reference with detection result of the specified detection unit becomes equal to or more than a predetermined threshold.

2. The communication unit according to claim 1, wherein the multiple types of the detection units have a second detection unit that detects a direction of a visual line or a face of the sender, and the communication terminal starts transmitting the communication data when the first detection unit detects the sender positioned within the predetermined area; the direction of the visual line or the face of the sender detected by the second detection unit is in a predetermined direction; and the matching degree obtained in collating the collation reference with the detection result of the specified detection unit becomes equal to or more than the predetermined threshold.

3. The communication unit according to claim 2, further comprising a display screen forming section that makes up a part of building material, furniture or a decoration article disposed in a building where the sender is present and forms a display screen of an image;
    wherein the display screen forming section makes an external appearance as the part with no formation of the display screen in a period when the first detection unit detects no person positioned within the predetermined area and forms the display screen only in the period when the first detection unit detects the person positioned within the predetermined area, and the communication terminal starts transmitting the communication data when the first detection unit detects the sender positioned within the predetermined area; the direction of the visual line or the face of the sender detected by the second detection unit is oriented to the display screen; and the matching degree obtained in collating the collation reference with the detection result of the specified detection unit becomes equal to or more than the predetermined threshold.

4. The communication unit according to claim 1, wherein the communication terminal starts transmitting the communication data when data indicating that the recipient is in a space where the at least one information is possible to be received is received from the device possessed by the recipient, and the first detection unit detects the sender positioned within the predetermined area; and the matching degree obtained in collating the collation reference with the detection result of the specified detection unit becomes equal to or more than the predetermined threshold.

* * * * *